Nov. 9, 1965     R. S. WEBB     3,217,207
PEAK DRIVE PROTECTIVE CIRCUIT
Filed May 26, 1961     2 Sheets-Sheet 1
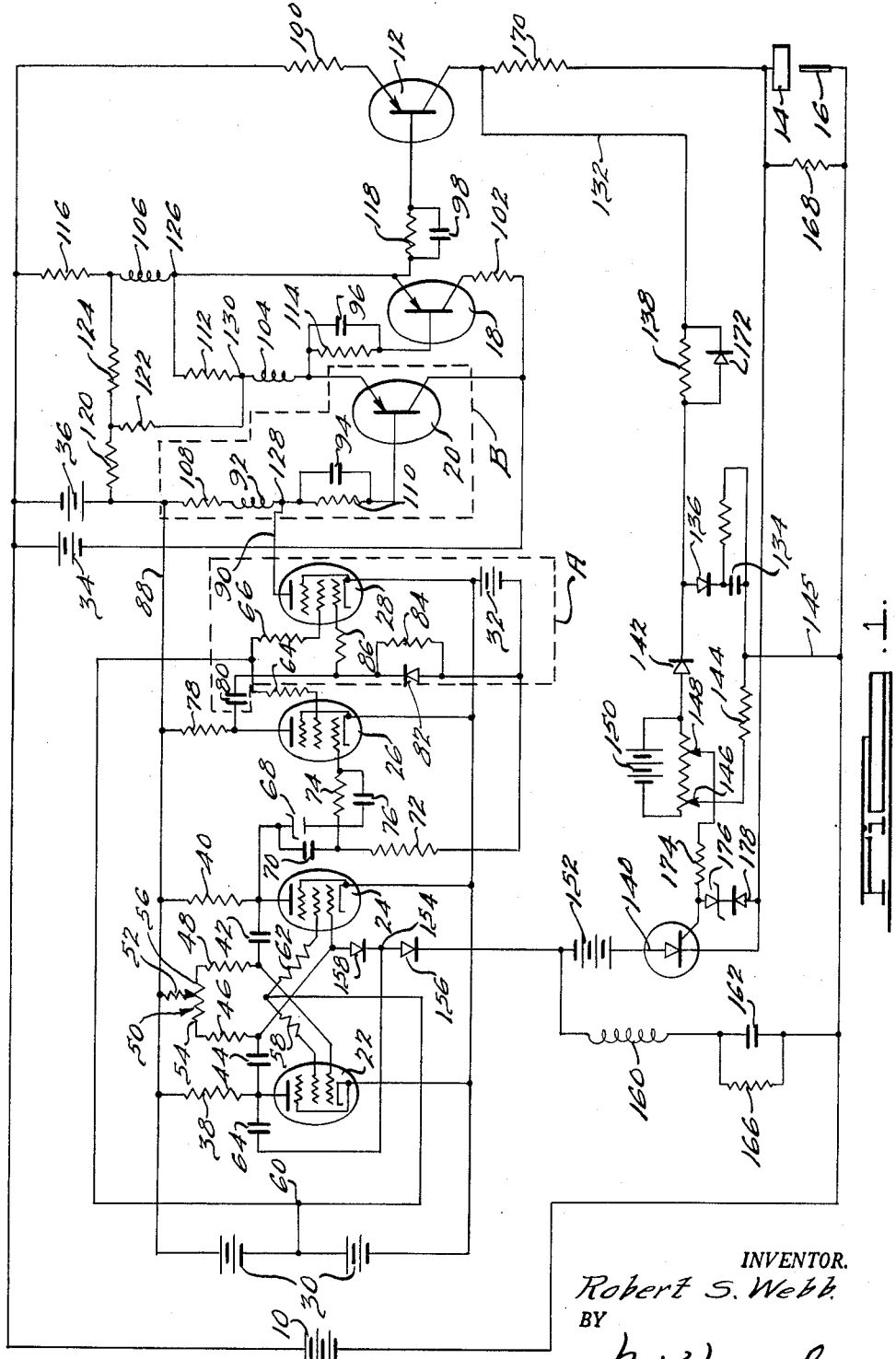
INVENTOR.
Robert S. Webb
BY
M R Murphy
ATTORNEY.

Nov. 9, 1965  R. S. WEBB  3,217,207
PEAK DRIVE PROTECTIVE CIRCUIT
Filed May 26, 1961 2 Sheets-Sheet 2
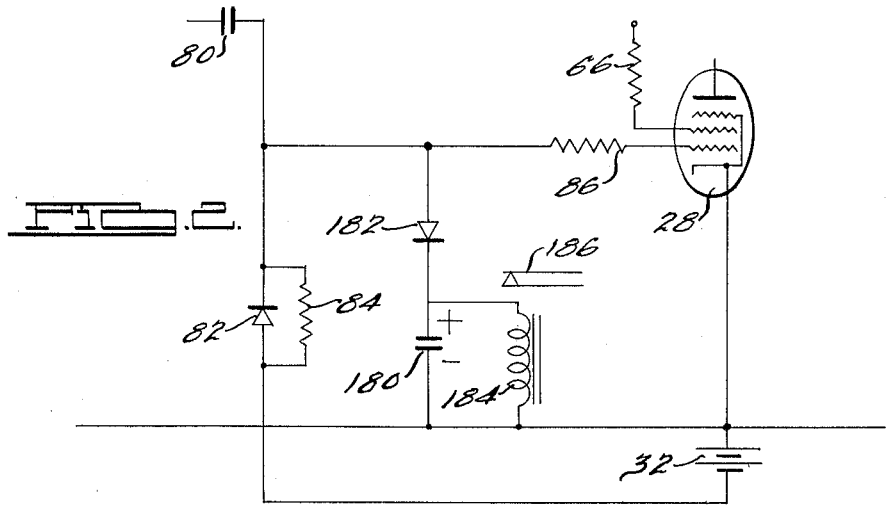
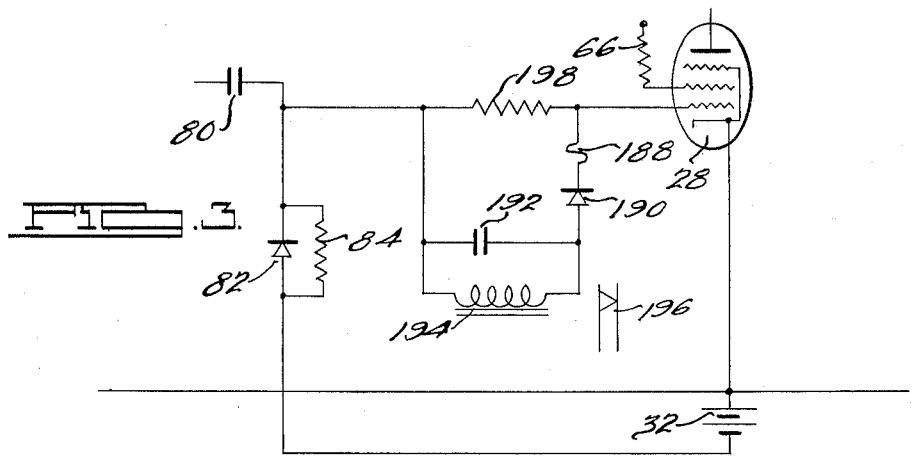
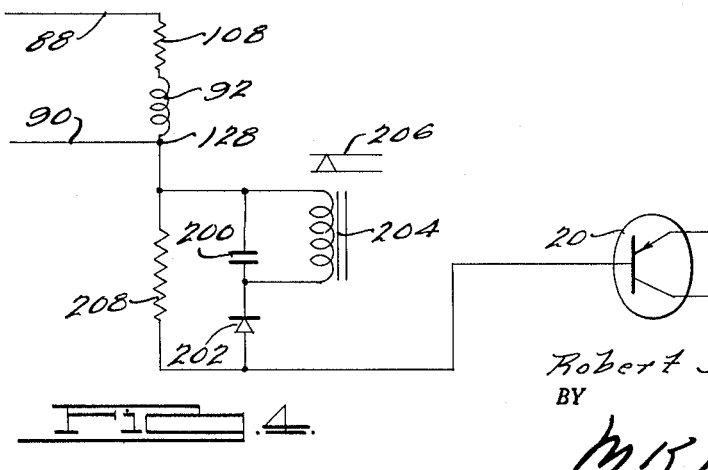
INVENTOR.
Robert S. Webb.
BY
*M. K. Murphy*
ATTORNEY United States Patent Office 3,217,207
Patented Nov. 9, 1965

3,217,207
PEAK DRIVE PROTECTIVE CIRCUIT
Robert S. Webb, Bloomfield Hills, Mich., assignor to Elox Corporation of Michigan, Troy, Mich., a corporation of Michigan
Filed May 26, 1961, Ser. No. 113,032
9 Claims. (Cl. 317—51)

This invention relates to electrical discharge machining and particularly to improved machining power circuits therefor.

Electrical discharge machining, sometimes referred to in the art as EDM, spark machining, or arc machining, is carried on by passing a series of discrete, localized, extremely high current density discharges across a gap between a conductive tool electrode and workpiece at sonic or ultrasonic frequencies in the presence of a dielectric fluid for eroding the workpiece.

In electrical discharge machining, the conductive tool is usually maintained in proximate position with the workpiece by an automatic servo feed and is advanced toward or into the workpiece as stock is removed therefrom.

A fluid coolant, usually a liquid, is circulated through the working gap to flush the eroded particles from the gap and is sometimes furnished under pressure by a pump through a pattern of holes in the electrode. The defining characteristic of electrical discharge machining is that the coolant is a dielectric such as kerosene, transformer oil or pure water and is broken down in minute, localized areas by the action of the machining power supply between the closest points of the tool and work.

Numerous improvements in the art of electrical discharge machining have caused it to advance from the stage of a laboratory curiosity to a highly productive machine tool widely used today in the toolroom and production line. Advanced electrical discharge machining power circuitry utilizes electronic switches, such as vacuum tubes for minutely and accurately controlling the discrete discharges across the gap. An example of the type of machining power circuit responsible for this advance is shown in Matulaitis and Lobur Patent No. 2,951,969, issued September 6, 1960. A machining power circuit such as disclosed therein, when combined with a power feed of an improved type, as shown in my Patent No. 2,962,630, issued November 29, 1960, results in a machine having excellent control characteristics and readily usable by machinists having mechanical skill only with no electrical or electronics background, as is typical of the machining trades. The principal limitation of the machining power circuit shown in Patent No. 2,951,969, is that vacuum tubes are employed and these devices are inherently low current, high voltage devices. Electrical discharge machining as now carried on, on the other hand, is an extremely high current, low voltage operation in which the discharge voltage, after ionization of the gap, is aproximately 15 volts regardless of machining current amplitude, the latter frequently being in the order of hundreds, sometimes thousands, of amperes.

The machining power circuit of many present day machines incorporates advanced electronic switches such as transistors, for much higher circuit efficiency and reliability and most present day circuits, whether transistor or vacuum tube or other electronic switch, employ nearly rectangular drive for proper control of gap switching characteristics.

This disclosure contains reference to transistors or vacuum tubes or other "electronic switches." It follows that with proper redesign of the circuit any "electronic switch" may be substituted. By "electronic switch" is meant any electronic control device having three or more terminals consisting of at least two terminals acting as a switch in the power circuit, the conductivity between said power terminals being controlled by a control element within the switch responsive to drive from an external control circuit whereby the conductivity of the power circuit is controlled statically or electrically without movement of mechanical elements within the switch. The term "control power terminal" or "control power electrode" refers to that power electrode which is utilized as a common operating element in the control and power circuits for the switch.

Such advanced circuits employ wide ranges in ON-OFF ratio or duty factor and widely varying frequencies or discharge repetition rates. For circuits of this type it is extremely difficult to maintain electronic switch protection circuitry operating correctly under these widely varying conditions. One type of important protection circuit is a drive failure protection circuit.

Most machining power circuits of this type are designed to operate at maximum efficiency with the electronic switch fully conductive during ON periods and biased completely OFF during OFF periods. Partial failure of this rectangular drive signal can result in incomplete switching of the device and this in turn can result in excessive losses across the device, producing poor circuit performance and damage to the electronic switch during this Class A or poor drive condition. Damage to the electronic switch under such partial drive failure condition occurs because of the design of the circuitry for normal operation under a completely switched condition carrying maximum rated current of the device usually at maximum rated wattage dissipation. Partial or complete failure of drive in many instances results in damage to the entire electronic switch bank comprising hundreds or perhaps thousands of vacuum tubes or transistors connected in parallel. Such failure is extremely costly.

Accordingly, it is the principal object of this invention to provide a drive sensing and protection circuit for protecting the delicate electronic circuitry and particularly the complex and expensive machining power electronic switch.

Another object of this invention is to provide a drive sensing circuit for detecting drive voltage below an acceptable minimum for operating disconnect circuitry in the event of such failure. By an acceptable minimum is meant a predetermined level of drive voltage in excess of the normal drive voltage i.e. in excess of that required to cause full conduction of the electronic switch.

Another object of this invention is to provide a drive sensing circuit responsive to the magnitude of drive current in an electronic switching device.

Other objects and advantages are disclosed in the following specification, which taken in conjunction with the accompanying drawings show preferred forms of practicing the invention.

In the drawings in which reference numerals have been used to designate like parts herein referred to:

FIG. 1 shows schematically a typical electrical discharge machining power circuit in which the protective sensing circuit may be employed.

FIG. 2 is an example of a protection circuit for a vacuum tube drive network such as shown in FIG. 1, which circuit is responsive to drive voltage.

FIG. 3 is a similar vacuum tube protection circuit in which the protection device responds to drive current rather than voltage.

FIG. 4 is a similar current sensitive circuit for protection in the event of drive current failure in a transistor circuit such as shown in FIG. 1.

Referring now to FIG. 1, machining power supply 10 is electronically switched by power transistor 12 for controlling the pulse duration and frequency of discharge across the gap between the workpiece 14 and electrode 16.

Power transistor 12 represents a bank of transistors, sometimes hundreds in number, depending on the machining power circuit required.

PNP transistors 18 and 20 are preamplifiers for driving the base of transistor 12 with the extremely high drive current required for a large bank of transistors. The rectangular pulse signal derived from multivibrator tubes 22 and 24 is preamplified in pentodes 26 and 28 which again may be banks of vacuum tubes to present suitable rectangular drive to the preamplifier transistors.

Power for the vacuum tube pulser and preamplifier is derived from plate supply 30 and bias 32. Drive power for the transistor preamplifier is obtained from transistor drive power supply 34. Transistor bias supply 36 is provided for biasing the transistors during perods of nonconduction just as bias 32 is provided for the vacuum tube preamplifier.

Multivibrator pentodes 22 and 24 have output signal resistors 38 and 40 connecting the anodes of the multivibrator tubes to the positive terminal of the plate supply voltage 30. The control grids of tubes 22 and 24 are cross-connected respectively through coupling capacitors 42 and 44 to the anodes of the opposing tubes and grid current limiting resistors 46 and 48 are connected as shown to rheostat 50 which, in combination with these two resistors and coupling capacitors 42 and 44, forms the time constant of operation of the multivibrator. The adjustable tap of rheostat 50 is connected through balancing resistor 52 to the positive terminal of supply 30.

This novel grid return of the multivibrator is extremely important in a modern electrical discharge machining power circuit because of the wide range of ON-OFF ratio required at a particular frequency. It is desirable to have the machine maintain the constant frequency and have a widely adjustable ON-OFF ratio at that particular frequency. This is achieved through the novel grid return rheostat 50.

As the adjustable tap on rheostat 50 is moved from side to side a decrease in resistance 54 on one side of the tap, increases resistance 56 on the other side thereby maintaining constant total grid resistance even though each grid circuit varies widely.

It is well known in multivibrator design that the operating period of a multivibrator may be represented by the formula:

$$t = K[C42(R48+R56) + C44(R46+R54)]$$

If coupling capacitors 42 and 44 are equal, the formula may be simplified to:

$$t = K_1(R48 + R50 + R46)$$

From this simplified formula, it can be seen that as the tap on rheostat 50 is moved from one extreme to the other, resistance is similarly moved from one grid return to the opposing grid return, thereby maintaining a constant frequency regardless of the position of rheostat 50.

The screen grid of pentode 22 is connected through resistor 58 to tap 60 on plate supply 30. Similarly, resistor 62 connects the screen of tube 24 to that same supply, just as resistors 64 and 66 return the screens of tubes 26 and 28 respectively to the screen grid tap of the plate supply.

Another important characteristic of this circuit is shown in the means of coupling the output signal of the multivibrator to the control grid of amplifier 26. As mentioned above, wide ratios of adjustment of ON-OFF ratio are required in a present day machine, particularly with regard to the minimum ON-time or output pulse duration of transistor bank 12. Analysis of this circuit will show that multivibrator tube 24 and power transistor 12 are ON or rendered conductive in phase. For extremely short or narrow ON-times, insufficient power is transferred through a coupling capacitor and therefore an improved circuit is required to properly couple the output of the multivibrator to amplifier tube 26.

This improved coupling circuit is achieved through use of a reference diode 68 and shunt capacitor 70 for referencing the rectangular or pulse output developed across signal resistor 40 downward as is required for proper control of the grid of amplifier 26. Bias return resistor 72 is provided to maintain tube 26 biased OFF during nonconducting portions of its cycle.

As multivibrator tube 24 becomes conductive, a voltage drop occurs across signal resistor 40. A typical value for plate supply voltage 30 is approximately 250 volts and the drop across multivibrator tube 24 during conduction is approximately 100 volts, therefore generating a signal of approximately 150 volts across resistor 40.

As long as the regulated voltage of reference diode 68 is larger than the drop across tube 24, the control grid of tube 24 will at this time, be negative. In the example given, this reference diode would have a magnitude of regulation of approximately 200 volts, and the control grid of tube 26 would be therefore biased to approximately minus 100 volts. Reference diode 68 and capacitor 70 form a network for a floating voltage supply having almost no capacitive losses during switching as would be encountered if a D.C. supply were developed and employed at this point with the high frequency passing characteristics required for sharp rise and fall of drive signal.

As multivibrator tube 24 becomes nonconductive, the voltage signal across resistor 40 disappears, thereby carrying the reference diode circuit positive. In this example, with a 250 volt plate supply and a 200 volt reference diode, approximately 50 volts is developed across resistor 74 connected in the control grid of tube 26 since the control grid clips the signal at approximately the same voltage as the cathode of tube 26. An extremely small lead capacitor 76 is connected across resistor 74 for improving the sharp rise and fall characteristics of this signal thereby causing amplifier 26 to both amplify and re-square the signal.

Amplifier 26 develops a signal across resistor 78 which is coupled through capacitor 80 and clamping diode 82 to the grid circuit of amplifier 28. Bias return resistor 84 and grid current limiting resistor 86 are provided as shown in a manner widely applied in pulser amplifier circuitry.

Generally the OFF-time or duration between pulses of the output transistor bank is at least 20% of the total signal compared to minimum ON-time of less than 1% of total signal. For such a conduction time of at least 20% for tube 26, sufficient power is transferred through coupling capacitor 80 and a normal coupling circuit may be employed in the grid circuit of amplifier 28.

In coupling the output of the last stage of vacuum tube amplification to the transistor preamplifier, the same problem prevails as in coupling the output of the multivibrator to the first stage of amplification. During narrow portions of conduction of the output transistor bank amplifier, tube 28 is also rendered conductive for a narrow portion of each cycle. An additional complication is that transistors are inherently low voltage, high current, devices and when connected in common emitter relationship as shown, require large amounts of drive current compared to a vacuum tube device which is essentially a voltage switch except in the regions of grid current. For this reason, the vacuum tube amplifier is interconnected as shown with the transistor preamplifier in which the positive terminal of plate supply 30 is connected to the positive terminal of bias supply 36 of the transistorized amplifier by lead 88.

Lead 90 is connected to the anode of amplifier 28 and in conjunction with lead 88 represents the signal output of the vacuum tube preamplifier.

At the instant of turn-ON of amplifier tube 28, which usually represents a bank of vacuum tubes, electron flow is from the negative terminal of supply 30 to the cathode of amplifier 28. From the anode of amplifier 28, this electron flow occurs instantaneously through line 90 and is retarded by the inductance of choke 92. Lead capacitor 94 permits this electron flow to enter the base of first transistor amplifier 20. At this first instant, all transistors are nonconductive and this signal is additionally led from the emitter of transistor 20 through lead capacitor 96, the base-emitter of transsistor 18, lead capacitor 98, base-emitter of transistor 12, balancing resistor 100 to the negative terminal of bias 36 and returned from the positive terminal of bias 36 to the positive terminal of the plate supply voltage 30.

This principle represents the fundamental improvement of this form of circuitry in that from the first instant of drive, signal is led through each stage of the amplifier tending to render all of the transistors of the amplifier, in addition to the output transistor bank conductive at the same instant. After the minute time required of transistor 20, it becomes conductive and amplifies signal and causes additional electron flow from the negative terminal of drive supply 34 through the collector-emitter of transistor 20 and additionally through the lead network 96, 18, 98, 12, 100, just like the signal from amplifier tube 28. Similarly, as transistor 18 is rendered conductive, additional amplified signal flows from the negative terminal of supply 34 through limiting resistor 102, the collector-emitter junction of transistor 18 and additionally through the lead network 98, 12. During this period of turn-ON, almost no shunt current flows in the corresponding bias circuits being blocked from each bias circuit by chokes 92, 104, 106 respectively. Furthermore, additional acceleration is provided by lead capacitors 94, 96, 98, thereby forcing all transistors sharply into conduction.

As lead capacitors 94, 96, 98 become charged and as conduction occurs through chokes 92, 104, 106, the circuit achieves steady state conduction. Resistors 108, and 110 are chosen with the voltage considerations in mind such that an approximately equal drive and shunt current flow occurs, the shunt current through choke 92 and resistor 108 after the minute delay interval of choke 92. Similarly, resistors 112 and 114 are chosen in accordance with this principle to provide equal drive current and shunt bias current during steady-state conditions as are resistors 116 and 118 respectively in the base circuit of transistor 12.

With the proper choice of these balancing resistors and consideration of the voltage dividers involved from bias supply 36, equal drive current and shunt current occurs in the base circuit of each transistor. As tube 28 is rendered sharply nonconductive, choke 92 continues electron flow from choke 92, resistor 108, resistor 120, resistor 122, choke 104, emitter-base of transistor 20, lead capacitor 94. Choke 92 sustains at the instant of turn-OFF a current equal to that flowing through it previously which by design is equal to the forward or drive current. The induced voltage of this choke in addition to the voltage stored across the lead capacitor 94 presents a sharp turn-OFF signal through transistor 20, thereby rendering it sharply nonconductive.

In a similar manner, choke 104 forces electron flow through resistor 112, emitter-base of transistor 18 and lead capacitor 96 thereby sharply biasing transistor 18 nonconductive.

Choke 106 similarly forces electron flow through resistor 116, balancing resistor 100, emitter-base of transistor 12, lead capacitor 98, thereby rendering the output transistor bank sharply nonconductive.

An analysis of this circuitry will show that these cascaded chokes "kick" properly in phase to sharply turn-OFF their respective transistors and output signal is divided from these chokes by the divider resistor networks as shown. Thus, a shunt path or electron flow for choke 106, for example, is also through resistors 124, 122, 112, which would tend to cause transistor 18 to remain conductive. Because the base circuit of transistor 18 is returned at point 126, the reflected magnitude of this "kick" is sharply reduced being equal only to the voltage developed across resistor 112. This voltage resulting from the "kick" of choke 106 is overcome by the "kick" of choke 104 in the base circuit of transistor 18. A similar divider occurs in returning the base circuit of transistor 20 to the anode of tube 28 at point 128. Thus, a portion of the choke voltage induced in each case is fed back to the preceding stage and is overcome by the choke of that preceding stage. Choke 92 and resistor 108 which are of high impedance, characteristic of the vacuum tube circuitry, must conduct to overcome the "kicks" of all subsequent chokes. Therefore, the induced voltage of choke 92 must exceed the total of chokes 106, 104, in order to sharply bias transistor 20 nonconductive by addition to the bias stored across capacitor 94 during conduction drive.

This unique circuit employing shunt choke drive and the cascaded returns as indicated at 126, 130, 128, forms an extremely sharp pulse drive during turn-ON of the transistor causing lead of drive current through the transistor network and during turn-OFF sustaining a sharp high conduction current for the duration of storage time and turn-OFF time of each stage of the transistor amplifier. By proper choice and balancing of these chokes, extremely sharp turn-OFF characteristics can be achieved for each stage of the transistor amplifier and of the entire amplifier as a unit. The degree of interconnection and cascading of this circuit is complex and requires special consideration in the calculation of each choke value and resistance value accordingly.

During periods of static nonconduction in which turn-OFF has been achieved and no current is flowing in the respective base circuits, bias is achieved on each stage of the transistor amplifier through the novel divider shown as resistors 116, 124, 120. Resistors 116, 124 and 120 are of successively higher resistance values, thereby producing a low voltage D.C. bias on the base of output transistor bank 12 and somewhat higher bias voltages on the bases of transistors 18 and 20 respectively. An additional resistor 122 is shown connecting point 130 with the tap between resistors 124 and 120 to provide bias to transistor 18. By proper selection of resistors 124 and 120, in accordance with the division of signal as previously outlined, this resistor may be eliminated. However, additional voltage is developed across resistor 112 from the induced voltage of choke 106 during turn-OFF unless resistor 122 is properly selected.

Normally, the machining power voltage 10 is very near the peak voltage rating of transistor bank 12, which is rated for voltage from collector to base as well as collector to emitter. By supplying an extremely low bias voltage of low impedance for the base of transistor 12, full advantage may be taken of the voltage ratings of this output transistor switch. Because of the extremely high drive currents required, excess power loss would occur in resistors 102, 116 and 118 except that drive supply 34 is of much lower voltage magnitude than machining power voltage 10. For this reason, higher bias voltages may be employed on transistors 18 and 20 without limitations in output switching.

During a condition of choke-induced voltage, the total voltage from emitter to collector of transistor 18 is that of supplies 34, 36, resistor 116 and choke 106 which at that instant is positive at terminal 126, therefore producing a somewhat higher switching voltage during the period of induced voltage of each of these chokes than the D.C. voltage of supplies 34, 36. Similarly, the voltage across choke 104 is added to that of 106 in the emitter-collector circuit of transistor 20 thereby producing an even higher switching voltage for this transistor. As mentioned earlier, the total voltage of choke 92 must exceed the sum of the others, however, this is well within the rating of the peak anode voltage of vacuum tube 28 since it is a high voltage device having a rating of several thousand volts rather than the maximum of 100 to 200 volts typical for power transistors of this type.

During pulse operation in which the output transistor bank is rendered sharply conductive and sharply nonconductive, this improved circuitry therefore provides extremely accelerated drive having sharp turn-ON and turn-OFF characteristics vastly improving the normal switching times of the particular transistors without additional loss of switching power.

This circuit includes an improved per-pulse short circuit sensing network for sensing abnormally low voltage condition across the machining gap. As the output transistor bank 12 is rendered sharply conductive, a keying lead 132 connects to this cut-OFF circuitry and at this time "keys" it into operation. During periods of conduction, line 132 is connected to the positive terminal of supply 10, less the minute losses in the collector-emitter circuit of transistor 12 and balancing resistor 100. This positive signal at line 132 draws electron flow through delay capacitor 134, diode 136, delay resistance 138. After the delay interval determined by product of capacitor 134, resistor 138, a portion of this positive or keying signal is presented to the gate circuit of silicon controlled rectifier 140. At this instant, the cathode of diode 142 is carried positive and therefore blocks electron flow. Connected to the negative end of delay capacitor 134 is resistor 144 and a sensing lead 145 returning this network to the negative terminal of supply 10 and also to electrode 16. Since rectifier 142 is blocked at this instant, a keying voltage determined by the difference between taps 146 and 148 from keying supply 150 carries the gate positive with respect to the electrode by the difference in this voltage between 146 and 148.

If after the delay time of network 134, 138, the electrode and workpiece are open circuited or if the machining voltage is above this preset amount, the cathode of controlled rectifier 140 will be more positive than the gate, thereby maintaining the controlled rectifier nonconductive. If a short circuit occurs or if the gap voltage between electrode 16 and workpiece 14 is below this predetermined amount, the gate is keyed positive with respect to the cathode and instantaneously triggers conduction of controlled rectifier 140. This condition corresponds to short circuit or an undesirably low machining voltage across the gap and should be so interrupted.

Conduction of controlled rectifier 140 through cut-OFF voltage supply 152 carries point 154 sharply negative since the cathode, at this instant, is approximately at the same voltage as electrode 16. Supply 152 is larger in voltage than the net of voltages 10, 36, 30, thereby carrying point 154 more negative in voltage than the cathode of multivibrator tube 24. As explained earlier, multivibrator tube 24 was conductive during this period of gap conduction caused by switching ON of transistor 12. Carrying point 154 negative with respect to the cathode, causes conduction through diodes 156 and 158 thereby triggering multivibrator tube 24 nonconductive. As this tube is rendered even partially nonconductive the signal becomes regenerative and is amplified by the normal multivibrator action of tubes 22 and 24 thus rendering tube 24 sharply nonconductive and interrupting conduction of machining power bank 12 which, of course, interrupts the flow of power through the machining gap.

Since a negative voltage is required at the anode of controlled rectifier 140 to interrupt the conduction of that device, it is achieved through choke 160 and capacitor 162. During this period of rectifier conduction, capacitor 162 is charged to the voltage of supply 152 through choke 160. Electron flow, in this instance, is through controlled rectifier 140, supply 152, choke 160, capacitor 162, electrode 16, workpiece 14 to the cathode of controlled rectifier 140. This causes a voltage drop across choke 160 inducing a flux field in this choke. As capacitor 162 becomes charged equal to supply 152, the field of choke 160 collapses to sustain conduction thereby overcharging capacitor 162. This capacitor is overcharged to a voltage approximately twice that of supply 152. After collapse of the field of choke 160, this negative voltage stored across capacitor 162 flows back through choke 160 thereby presenting a negative voltage at the anode of controlled rectifier 140 causing it to cease conduction. Additional electron flow occurs from this capacitor into diodes 156, 158 and multivibrator coupling capacitor 44. A shunt electron flow occurs through diode 156 into capacitor 164 which adds to coupling capacitor 44. This larger capacity maintains the grid of tube 24 negative for a longer duration than normal and therefore permits complete recovery of the machining gap. Generally, this capacitor is two to three times the capacity of capacitor 44 thereby increasing the OFF-time by a proportional amount. After discharge of capacitor 164 and 44, the multivibrator triggers into conduction in the normal manner and diodes 158 and 156 again block. The time constant of resistor 166, capacitor 162 is of sufficient length to cause recovery of the blocking characteristic of controlled rectifier 140.

In a typical electrical discharge machine, a wide variety of frequencies are used and this is achieved through different values of coupling capacitors such as 42, 44 or through changes in resistors 48, 50, 46. This is achieved through switching means and is straightforward and is not shown in the interest of simplicity. In each case, however, where coupling capacitor 44 is switched, OFF-time control capacitor 164 must also be switched to maintain this same approximate time relationship between a failure pulse and a normal conduction pulse. Capacitor 162 and choke 160 conduct relatively higher current than either capacitor 164 or capacitor 44, such that changes in these values of capacitance do not materially affect this turn-OFF circuit.

During normal periods of OFF-time in which controlled rectifier 140 has not fired, bias is maintained on the gate of that rectifier by electron flow through tap 146, resistor 144, resistor 168, resistor 170, keying lead 132, diode 172, diode 142, to the positive terminal of bias supply 150. At this time, the cathode controlled rectifier 140 is returned to resistor 168 and through application of this divider network, the gate is maintained negative at these times. If this negative bias exceeds the rating of the particular device, resistor 174, reference diode 176, diode 178 are provided to additionally clip this signal to wtihin the negative or bias rating of the particular controlled rectifier.

Operation of this complete circuit is therefore within the design considerations in which the output transistor bank is rendered sharply conductive or nonconductive at selected ON-OFF ratio and selected frequency during normal machining permitting pulsing of the gap at this ON-OFF ratio and controlled machining results.

For a constant value of resistance 170 and a constant supply voltage 10, machining current increases in direct proportion to the ON-time at a particular frequency. In this manner, very exact control is achieved of actual machining current. This resistor may also be switched to cause a different peak machining current thereby permitting even more accurate adjustment of machining conditions.

The per pulse cut-off circuitry responds instantaneously and through application of this novel keying network permits each pulse of machining power to be electronically inspected. Since satisfactory machining at the gap takes place above approximately 15 volts, the level of this keying reference may be set accordingly and any pulse having a gap voltage lower than 15 volts or the desired voltage, is instantaneously interrupted by the per pulse cut-off circuit after the desired leading edge delay interval.

During times of this malfunction at the gap, a new OFF-time prevails as determined by this improved cut-off circuitry thereby permitting complete recovery of the gap between pulses and yet not interrupting or cutting off pulses during desirable machining conditions. It is not uncommon in a train of many pulses to have perhaps two or three pulses pass satisfactorily; one pulse representing unsatisfactory conditions being interrupted permitting thereafter a series of additional satisfactory pulses, etc., a method of circuit operation superior to those previously used in the art. By proper selection of delay capacitor 134, the leading edge of each pulse is permitted to pass thereby achieving the effect of breaking minute stringers that tend to bridge the gap between the electrode and workpiece in a manner substantially better than that disclosed in the above mentioned Patent No. 2,951,969.

FIG. 2 shows a preferred form of drive protection circuit which may be used with the basic EDM circuit just described. The FIG. 2 circuit is adapted to be substituted in the FIG. 1 circuitry as indicated by the broken line box A.

Referring now to the circuitry of FIG. 2, the basic drive components of the circuit of FIG. 2 consisting of amplifier tube 28, screen grid resistor 66, coupling capacitor 80, clamping diode 82, drive signal resistor 84, and grid current limiting resistor 86 correspond exactly to that portion of the circuitry of FIG. 1. The drive amplitude detection circuit consists of storage capacitor 180, diode 182. The negative end of capacitor 180 is connected to the cathode of tube 28. The cathode of diode 182 is connected to the positive terminal of capacitor 180 and the anode of diode 182 is connected to the positive side of grid current limiting resistor 86.

The essential elements of the protection network comprise a relay 184 having contacts 186. The relay coil is connected across the capacitor 180 as shown, and the contacts are preferably connected in series with the machining voltage supply 10.

Usually the drive circuits of all high power devices of this type is operated during conduction in the region of grid current, and during any period of ON-time grid current flow from the cathode to the grid of tube 28 through resistor 86 and coupling capacitor 80 results in a positive voltage at the anode of diode 182. With this circuit connected as shown, no shunt current flow occurs through capacitor 180 and diode 182 until tube 28 is operated in the positive grid region at which time this tube is completely switched. Even brief periods of ON-time store sufficient voltage across capacitor 180 to energize relay 184 actuating contacts 186. Relay contacts 186 serve as interlock contacts in the machining power circuit. Bias and filament power and power to a number of auxiliary circuits including plate supply 30, is normally energized prior to the machining power circuit. In the circuit of FIG. 2, it is necessary for the voltage across capacitor 180 to energize relay 184 and actuate contacts 186 before machining power supply 10 of FIG. 1 may be turned ON. In the circuit of FIG. 1, transistor power supply 34 is generally turned ON at the same instant as machining power 10 and thus failure of this drive circuit to actuate prevents turn-ON of either circuit and assures safety of the transistor amplifier as well as the output transistor bank itself. The negative end of capacitor 180 and relay 184 may be connected to the negative terminal of bias supply 32 if it is intended to operate the circuit below the level of grid current, but much sharper control is achieved through connecting the circuit as shown and detecting a voltage magnitude above the positive grid limit.

FIG. 3 is a modified protection circuit which may be used in place of that shown in FIG. 2. The circuitry of FIG. 3 is similar to that of FIG. 2 except that the detection network responds directly to grid current rather than drive voltage. In the circuit of FIG. 3, fuse 188, diode 190, and capacitor 192 are connected to respond to the peak grid current magnitude of each pulse. Relay coil 194 is connected across capacitor 192 and contacts 196 operate similarly to contacts 186 in FIG. 2. The grid current detection network of FIG. 3 is connected across grid current limiting resistor 198 (which in this instance replaces the resistor 86 in FIG. 1) and the absence of grid current flow results in no voltage across resistor 198. Thus this network is current sensitive rather than voltage sensitive although operation is similar to that of FIG. 2.

Grid current of sufficient magnitude results in a voltage across resistor 198 of the desired level and charges capacitor 192 through fuse 188 and diode 190, similarly energizing relay coil 194 and actuating contacts 196. Fuse 188 is included in this current sensitive network to protect the circuit in the event of a grid-to-cathode short of tube 28. In such a condition, excess current flow occurs through resistor 198 and fuse 188 causing fuse 188 to blow producing a condition corresponding to insufficient drive. Thus this particular network responds not only to drive amplitude failure but to failure of the device as well.

The FIG. 4 protection circuit is intended to be incorporated in FIG. 1 in the portion enclosed by the broken line box B, and may be used in place of, or in addition to, the protection circuits of FIG. 2 or FIG. 3. The circuit of FIG. 4 shows a transistor drive current network constructed according to similar principles as the circuits of FIGS. 2 and 3. This circuit is intended for use in the base circuit of any drive transistor or of the main power bank itself. In this example, it is shown connected to the base circuit of amplifier transistor 20, but could, and in many instances would be used in the base circuit of power transistor bank 12. Capacitor 200 and diode 202 form a similar current sensitive network as the above figures and relay coil 204 actuates contacts 206 in a similar manner. This circuit is also current sensitive responding to peak current flow through drive resistor 208. Drive resistor 208 replaces resistor 110 of FIG. 1 and compensates for the additional parallel resistance of coil 204. Operation of this circuit is similar to that of FIG. 3 in which drive current below the acceptable limit fails to energize relay 204 to actuate contacts 206. The switching means, transistor 20, is similarly connected to the output of an amplifier adapted to provide a drive signal thereto at a predetermined level in excess of its normal drive signal so that the disconnect means, relay coil 204, is operable responsive to drive signal below that level. The disconnect operation is thus performed in a timely manner so that partial drive with resultant damage to the switch itself is averted.

The electromagnetically controlled contacts 186 of FIG. 2, 196 of FIG. 3, and 206 of FIG. 4, may be connected in series with the main power supply 10, in which case opening of the contacts will cut off machining power; or the contacts may be connected in series with the drive or bias supply of the tube or transistor banks. In the latter case, opening of the contacts will, of course, cut off the drive to the corresponding electronic element only thereby biasing the circuit OFF but this in effect will also cut off machining power as no drive will be available.

In all of these examples the circuitry has been shown as connected in a manner to energize the relay coil and actuate the control contacts. It is believed apparent from this disclosure that any other actuating device, even an electronic switch or an oppositely phased relay circuit might be incorporated in place of the relay designed to respond to the corresponding voltage amplitude across the storage capacitor in the particular example desired. Such a device might operate instantaneously to disconnect the circuitry in the event of failure or insufficient drive during operation as well as prevent connection of the circuitry prior to drive of sufficient amplitude.

In the above drawings, the D.-C. supplies are shown as batteries in the interest of simplifying the disclosure. In actual practice, these sources of D.-C. are derived from the secondary of a transformer having its primary connected to the power source for the machine which may be single phase or polyphase A.-C. The secondary voltage is rectified and stored, usually in an electrolytic storage capacitor to form a nearly ideal D.-C. source having very low internal impedance.

In the above examples, the electrode is shown as connected to the negative output of the machining power supply and the workpiece to the positive output. Present day knowledge indicates that in certain specialized and improved forms of machining that polarity may be reversed. It is essential in each case that discrete pulses of the same polarity be applied in each case and that polarity be selected in accordance with known principles. The above examples apply equally well to either polarity of machining.

It may thus be seen that I have shown and described a new and improved drive failure detection circuit that may be successfully employed in any electronic equipment employing electronic switches, and preferred examples of apparatus constructed in accordance with the teachings of this invention. By so doing it is not intended to limit the invention to the above disclosure but only as set forth in the following claims.

I claim:

1. A protective circuit for an electronic switch connected to a power supply comprising, a pulser operatively connected to said switch for providing drive pulses thereto, sensing means operatively connected to the drive circuit of said switch for sensing the peak magnitude of drive signal, and a disconnect means operatively connected to said sensing means and operable responsive to a predetermined decrease of said peak magnitude to interrupt power to said switch.

2. A protective circuit for an electronic switch connected to a power supply comprising a pulser operatively connected to said switch for furnishing drive pulses thereto at a predetermined level in excess of its normal drive signal, means for sensing peak voltage of said pulses operatively connected to the control power electrode of said switch, and a disconnect means operatively connected to said sensing means responsive to drive signal of peak voltage below said predetermined level but above the normal drive signal to interrupt power to said switch.

3. A protective circuit for an electron tube connected to a power supply comprising a pulser operatively connected to said tube for furnishing drive pulses thereto at a predetermined level in excess of its normal drive signal, a signal limiting resistor connected in series with the control grid of said tube, a peak current sensing means connected in series across said resistor, and a disconnect means operatively connected to said sensing means and operable responsive to drive signal of peak current below said predetermined level but above the normal drive signal to interrupt power to said tube.

4. The combination as set forth in claim 1 in which said sensing means comprises a serially connected diode and capacitor and in which said disconnect means is connected in parallel with said capacitor.

5. The combination as set forth in claim 1 in which said disconnect means comprises the coil of a relay having its contacts operatively connected to and controlling the output from said power supply.

6. The combination as set forth in claim 1 in which said sensing means comprises a diode and a capacitor connected in series across the control electrode and the control power electrode of said switch.

7. The combination as set forth in claim 1 in which said disconnect means comprises the coil of a relay having its contacts operatively connected to and controlling the supply of power to said switch.

8. The combination as set forth in claim 1 in which a source of bias potential is operatively connected to said switch and said sensing means comprises a unidirectional current conducting device and a capacitor connected in series between the control electrode of said switch and said source.

9. A protective circuit for a transistor connected to a power supply comprising a pulser operatively connected to the control electrode of said transistor for furnishing drive current pulses at a predetermined level, means operatively connected to the drive circuit of said transistor for sensing the peak magnitude of drive current, and means operatively connected to said sensing means for disconnecting said transistor from said power supply responsive to a decrease in peak drive current below said predetermined level.

References Cited by the Examiner

UNITED STATES PATENTS

| 2,866,921 | 12/58 | Matulaitis | 219—69 X |
| 2,997,631 | 8/61 | Moakler | 317—148 X |
| 3,021,452 | 2/62 | Eberle | 317—31 X |

OTHER REFERENCES

Solid State Products Incorporated, Bulletin D420–02–12–59, December 1959.

SAMUEL BERNSTEIN, *Primary Examiner.*